(12) United States Patent
Shetty et al.

(10) Patent No.: US 6,904,420 B2
(45) Date of Patent: Jun. 7, 2005

(54) NEURO/FUZZY HYBRID APPROACH TO CLUSTERING DATA

(75) Inventors: Ravindra K. Shetty, Bangalore (IN); Ashwin Kumar, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 760 days.

(21) Appl. No.: 09/860,165

(22) Filed: May 17, 2001

(65) Prior Publication Data

US 2003/0046253 A1 Mar. 6, 2003

(51) Int. Cl.[7] .................. G06G 7/00; G06G 3/00; G06E 1/00; G06F 15/18
(52) U.S. Cl. ........................... 706/1; 760/20
(58) Field of Search ............................... 706/1

(56) References Cited

U.S. PATENT DOCUMENTS

| | | | |
|---|---|---|---|
| 5,343,465 A | * 8/1994 | Khalil | 370/232 |
| 5,625,552 A | 4/1997 | Mathur et al. | 700/42 |
| 5,724,987 A | 3/1998 | Gevins et al. | 600/544 |
| 5,974,412 A | 10/1999 | Hazlehurst et al. | 707/3 |
| 6,157,921 A | 12/2000 | Barnhill | 706/16 |
| 6,171,480 B1 | 1/2001 | Lee et al. | 210/85 |
| 2003/0210816 A1 | * 11/2003 | Comaniciu et al. | 382/171 |

* cited by examiner

Primary Examiner—Anthony Knight
Assistant Examiner—Michael B. Holmes
(74) Attorney, Agent, or Firm—Kris T. Fredrick (57) ABSTRACT

A technique for clustering input data includes receiving data and reading a sample of the received data having a predetermined window length. The technique further includes checking the read sample of data for uncertainty and/or robustness and determining the clustering approach to be used to cluster the received data based on the outcome of the checking.

40 Claims, 4 Drawing Sheets

NEURO/FUZZY HYBRID APPROACH TO CLUSTERING DATA

FIELD OF THE INVENTION

This invention relates generally to the field of intelligent information retrieval, and more particularly pertains to an improved clustering technique for static as well as real-time data in data mining applications.

BACKGROUND

Clustering is a process by which we search for patterns in data and classify these patterns into categories such that the degree of association is high among the data in a chosen category. Clustering is generally accomplished by automatic characterization, detection, and classification of input data. However, the applicability of clustering is not restricted to pattern recognition. It is applicable, for example, to the taxonomies in biology, to classification of documents in information retrieval, and to social groupings based on various criteria. Clustering can also be used in data mining applications, by applying clustering to prediction tools for training data for prediction of unknown data.

The current approaches to clustering broadly fall under statistical, machine learning, and fuzzy based techniques. The statistical technique analyzes the linear characteristics of the data and classifies them. A machine learning based technique, such as the Artificial Neural Network (ANN), is trained to capture the non-linear characteristics of the data, resulting in a better classification. The fuzzy set theory technique introduces robustness in the classification process by introducing uncertainty similar to human thinking.

The ANN technique attempts to emulate the architecture and information representation schemes of the human brain and its architecture depends on the goal to be achieved. The learning in ANN can be either supervised or unsupervised. In a supervised learning (SL) we assume what the result should be (like a teacher instructing a pupil). In this case we present the input, check what the output shows and then adjust the connection strengths between the input and output mapping until the correct output is given. This can be applied to all inputs until the network gets as error free as possible. The SL method requires an output class declaration for each of the inputs.

Unsupervised learning (USL) or learning without a teacher refers to situations where the input (training) samples are not classified prior to inputting them into the network. In USL the network recognizes features of the input data itself (self-organizes) and displays its findings in some way as to be of use. This is a much more demanding task for the network. The two generally used USL approaches are the parametric approach involving combined classification and parameterization and the non-parametric approach involving partitioning the unclassified data into subsets using Adaptive Resonance Theory (ART). ART encompasses a wide variety of neural networks (NN) based on neurophysiology including prior knowledge and adaptive to learn/acquire new knowledge. This phenomenon known as the stability—plasticity dilemma forms the basis for competitive learning.

The Fuzzy logic approach is carried out by defining relations between data based on factors such as similarity, preference, and uncertainty. This relationship between the input data is represented by a degree of membership.

Current approaches to clustering based on statistical methods do not capture any nonlinear relationship that can exist between the input data, and hence can result in poor classification of input data where non-linearity might exist between input data. On the other hand the ANN and the fuzzy methods can handle static and real-time characteristics, uncertainty, and robustness required in an integrated manner in the input data. However, for a clustering technique to be efficient, it should be able to provide a generic solution to static/real-time data based on characteristics, such as linearity, non-linearity, uncertainty, and robustness.

Therefore, there is a need in the art for an efficient technique that can provide a generic solution to clustering input data (static as well as real-time data) having characteristics such as linearity, non-linearity, uncertainty, and robustness.

SUMMARY OF THE INVENTION

The present invention discloses a clustering technique for input data by receiving data and reading a sample of the received data having a predetermined window length. The read sample of data is checked for uncertainty and/or robustness. A clustering approach is determined to cluster the received data based on the outcome of the checking.

One aspect of the present invention is a computer readable medium having a computer-executable instructions for clustering input data. According to the method, clustering of the input data is accomplished by receiving data and reading a sample of the received data having a predetermined window length. The read sample of data is checked for uncertainty and/or robustness. A clustering approach is determined to cluster the received data based on the outcome of the checking.

Another aspect of the present invention is a computer-implemented system for clustering input data. The computer-implemented system comprises a receive module to receive data, and a reading module to read a sample of the received data having a predetermined window length. Further the computer-implemented system includes an analyzer to check the read data for uncertainty and/or robustness, and determine the clustering approach to be used to cluster the received data based on the outcome of the checking.

Other aspects of the invention will be apparent on reading the following detailed description of the invention and viewing the drawings that form a part thereof.

DETAILED DESCRIPTION

This invention offers an efficient technique for clustering input data (static as well as real-time data) having characteristics such as linearity, non-linearity, uncertainty, and robustness.

Figure 1:
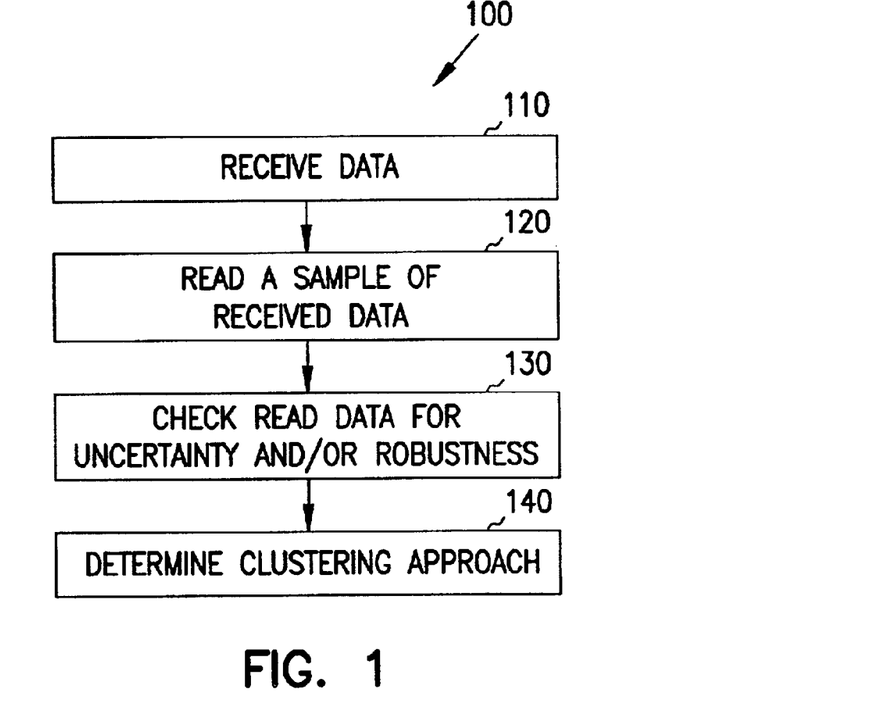
FIG. 1 illustrates the overall operation of the present invention.

FIG. 1 illustrates an overview of one embodiment of the process 100 of the present invention. This process 100 provides, as illustrated in step 110, a computer-implemented system including a receive module. The receive module, receives data such as time series data (for example, time series data can include real-time data such as share market data and weather forecast data), text document data, and/or static unstructured data. The received data is represented as follows:

$x_1, x_2, \ldots, x_m \in R^n$. where $x_1, x_2, \ldots, x_m$ are input data values each having n attributes.

For example, if the data selected for a study includes characteristics of 4 types of crabs based on species and sex such as BM, BF, OM, and OF, where B is for Black, O for Orange, M for Male, and F for Female. Then FL, RW, CL, CW, BD are the original features/attributes under consideration, where W is for width, L for length, D for diameter, C for claw, B for body, F for front, and R for rear.

Step 120 includes reading a sample of the received data having a predetermined window length. If the received data is the static data, then step 120 reads a sample of the received static data values of predetermined window length. For example, when 100 static data values are received and reading a sample of the received static data values having a window of length L=20 means, reading a subset of 20 of the 100 received static values. In our crab example above, assuming 200 input data values, the read samples of data can be categorized as follows:

| FL | RW | CL | CW | BD |
|---|---|---|---|---|
| 14.3 | 11.6 | 31.3 | 35.5 | 12.7 |
| 14.6 | 11.3 | 31.9 | 36.4 | 13.7 |
| ... | | | | |
| ... | | | | |
| 22.5 | 17.2 | 43 | 48.7 | 17.8 |
| 21.7 | 17.1 | 41.7 | 47.2 | 19.6 |

If the received data is real-time data, then step 120 reads a sample of the real-time data using a dynamically varying window of predetermined window length. For time-series data, the dynamically varying window varies with time (dynamically sliding window). For example, assuming a window length of L=20, at time t=0, step 120 reads real-time data 1-20, at time t=1, step 120 reads real-time data 2-21, at time t=2, step 120 reads real-time data 3-22, and so on. The amount of overlap between the current window and a next window is generally variable and problem dependent. Therefore at time t=1, step 120 can read real-time data 3-22, and at time t=2, step 120 reads real-time data 5-24, and so on.

In some embodiments, if the read data is the text data, then the text data is transformed into unique numerical representations.

In some embodiments, the read data is normalized based on attributes as indicated below.

(Attribute_max)$_j$ ← max $\{x_{ij}$ i:to m, j:1 to n$\}$ $$b_{ij} \leftarrow \frac{x_{ij}}{(\text{Attribute\_max})_j} \forall i: 1 \text{ to } m, \text{ and } j: 1 \text{ to } n$$

where $x_{ij}$ is the $i^{th}$ data value having $j^{th}$ attribute, and $b_{ij}$ is the normalized form of $x_{ij}$.

The normalized form of the data for the above-indicated 200 input data values can be as follows:

| | | | | |
|---|---|---|---|---|
| 0.148352 | 0.122711 | 0.294872 | 0.347985 | 0.128205 |
| 0.161172 | 0.141026 | 0.331502 | 0.380952 | 0.135531 |
| ... | | | | |
| ... | | | | |
| 0.412088 | 0.315018 | 0.787546 | 0.891941 | 0.362637 |
| 0.423077 | 0.369963 | 0.846154 | 0.961538 | 0.386447 |

Step 130 includes checking the read data for uncertainty and/or robustness. In some embodiments, checking for uncertainty and/or robustness includes selecting multiple blocks of data from the read data, and computing dispersions for each of the selected blocks. It further includes computing the sum of variance from the computed dispersions, and comparing the variation in the computed sum of variance to a predetermined variance threshold value. In some embodiments, the dispersion and sum of variance is computed as follows:

Selecting multiple input blocks of length l randomly from the input data values $$\left[ l \cong \left(\frac{1}{10}\right)^{th} \text{ of the total input } (=m) \right].$$

The number of input blocks selected is p.

Selecting an attribute set b randomly from the entire set

The dispersion (variance) in each of the input blocks of length l (for selected attribute set) is calculated as follows:

$$\sigma_{k,i}^2 = 1/l \sum_{j=1}^{l} \sqrt{(x_{ji}^2 - \overline{x_i})^2}$$

where $\overline{x}_i$ is the mean of the input value, k=1 to p; i=1 to b.

$$\overline{x}_i = \frac{\sum_{j=1}^{l} x_{ji}}{l}$$

The sum of variance over all the selected attributes 'b' is computed as follows:

$$S_k = \sum_{i=1}^{b} \sigma_{k,i}^2 \text{ where } i \in b, \; k \in p$$

Step 140 includes determining the clustering approach to be used to cluster the received data based on the outcome of the checking. In some embodiments, the clustering approach to be used is determined based on comparing variation in the computed sum of variance with a predetermined variance threshold value as indicated below.

If $\sigma(\|S_i - S_j\|) \leq$ variance_threshold where $i, j \in p$

The magnitude of variance_threshold depends on the closeness of the randomly selected data sets. Generally, a lower variance_threshold value means clear distinction between classes may not be there.

In some embodiments, a fuzzy logic approach is used for clustering the read sample of data when the variation in the computed sum of variance is less than or equal to the predetermined variance threshold value, and an unsupervised learning approach is used for clustering when the variation in the computed sum of variance is greater than the predetermined variance threshold value. In some embodiments, the unsupervised learning approach includes grouping of read data based on a parametric approach involving combined classification. The unsupervised learning approach can also include grouping read data based on a non-parametric approach involving partitioning the unclassified data into subsets using Adaptive Resonance Theory. Some embodiments include clustering the read data based on input data characteristics such as linearity, non-linearity, uncertainty, and/or robustness. In some embodiments, the data mining applications include applications such as pattern recognition, pattern prediction, and/or supervised machine learning systems. The above-described steps are repeated for each of the samples of data in a dynamically sliding window of predetermined window length, when the received data is real-time data.

Figure 2:
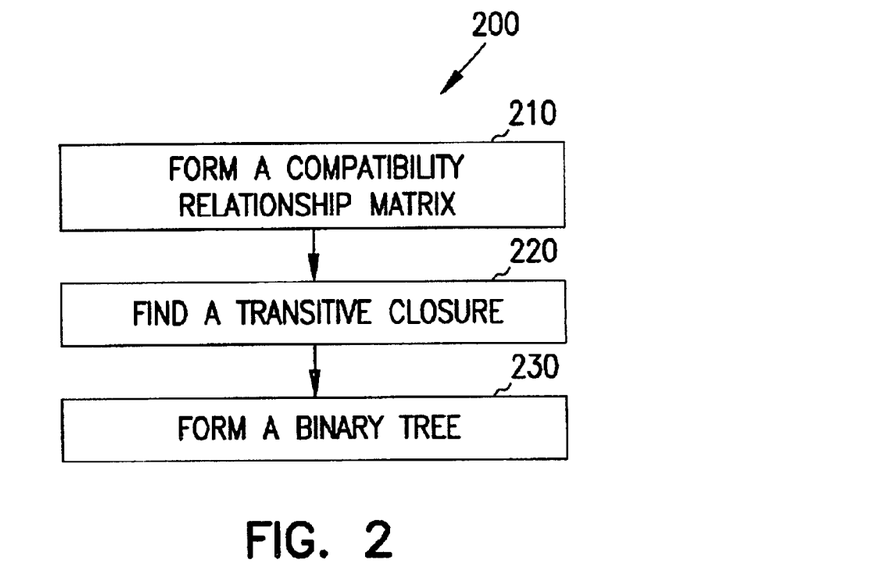
FIG. 2 illustrates clustering operation using the fuzzy logic technique.

FIG. 2 illustrates an overview of clustering operation 200 according to the present invention. The clustering operation 200 illustrated in FIG. 2 is a Fuzzy logic approach. The operation 200 begins with step 210 by forming a compatibility relationship matrix including the input data using a distance function such that values obtained using the distance function are between 0 and 1. In some embodiments, the compatibility relationship matrix is computed using a distance function of the Minkowski class as follows:

$$R_c(x_i, x_j) = 1 - \delta\left(\sum_{l=1}^{n}(x_{il} - x_{jl})^2\right)^{1/2}$$

where i, j: 1 to m, and $$\delta = \left(\frac{1}{n}\right)^{\frac{1}{2}}.$$

Where δ is the constant used to keep the function value within the boundary between 0 to 1 (since the fuzzy membership degree is generally between 0 and 1). The size of the matrix is the same as the number of input data values. In the crab example indicated with reference to FIG. 1, the size of the matrix would be 200×200 and the computed compatibility relationship matrix would be as follows:

| 1.000 | 0.964 | 0.947 | 0.931 | ... | 0.451 | 0.445 | 0.430 | 0.356 |
| ... | | | | | | | | |
| ... | | | | | | | | |
| 0.356 | 0.391 | 0.408 | 0.424 | ... | 0.900 | 0.905 | 0.915 | 1.000 |

Step 220 includes forming a transitive closure of the formed compatibility relationship matrix. In some embodiments, the transitive closure of $R_c$ is computed as follows:

$$R' = R_c \cup (R_c \cdot R_c)$$

where $\cup$ = Max operator, $\cdot$ = Max-Min composition, and $R \cdot R = r_{ij} = \max_k \min(r_{ik}, r_{kj}) i, j, k: 1$ to $m$ If R' is not equal to $R_c$ then make $R_c=R'$ and $R_t=R'$; $R_t$ (m×m) is the Transitive closure matrix. The transitive closure matrix for the crab example indicated above would be as follows:

| 1.000 | 0.964 | 0.964 | 0.964 | ... | 0.579 | 0.573 | 0.558 | 0.484 |
| ... | | | | | | | | |
| ... | | | | | | | | |
| 0.484 | 0.484 | 0.484 | 0.484 | ... | 0.900 | 0.905 | 0.915 | 1.000 |

Step 230 includes forming a binary tree including hierarchical clusters from the found transitive closure. In some embodiments, the hierarchical clusters using the binary tree is formed as indicated below:

Define the node of a binary tree array of members (contains indices of data in that node) and count the number of elements in that node.

Calculate the alpha value of a node as follows:

$(alpha)_{node} = [(\text{maximum of the membership values}) +$ $(\text{minimum of the membership values}]/2\}.$ $= \{\text{Maximum}(r_{ij}) + \text{Minimum}(r_{ij})\}/2$ where i is the first member of node under consideration and j are the indices of other members.

Construct left and right nodes as follows:

$(members)_{leftnode}=\{j|r_{ij}>\text{alphavalue}\}$ where i is the first member of parent node and j are the indices of other members.

$(members)_{rightnode}=\{j|r_{ij}\leq\text{alphavalue}\}$ where i is the first member of parent node and j are the indices of other members.

If $|(alpha)_{leftnode}-(alpha)_{parent}|>\text{threshold\_value}$ then calculate alpha value of the node.

If $|(alpha)_{rightnode}-(alpha)_{parent}|>\text{threshold\_value}$ then calculate alpha value of the node.

Figure 3:
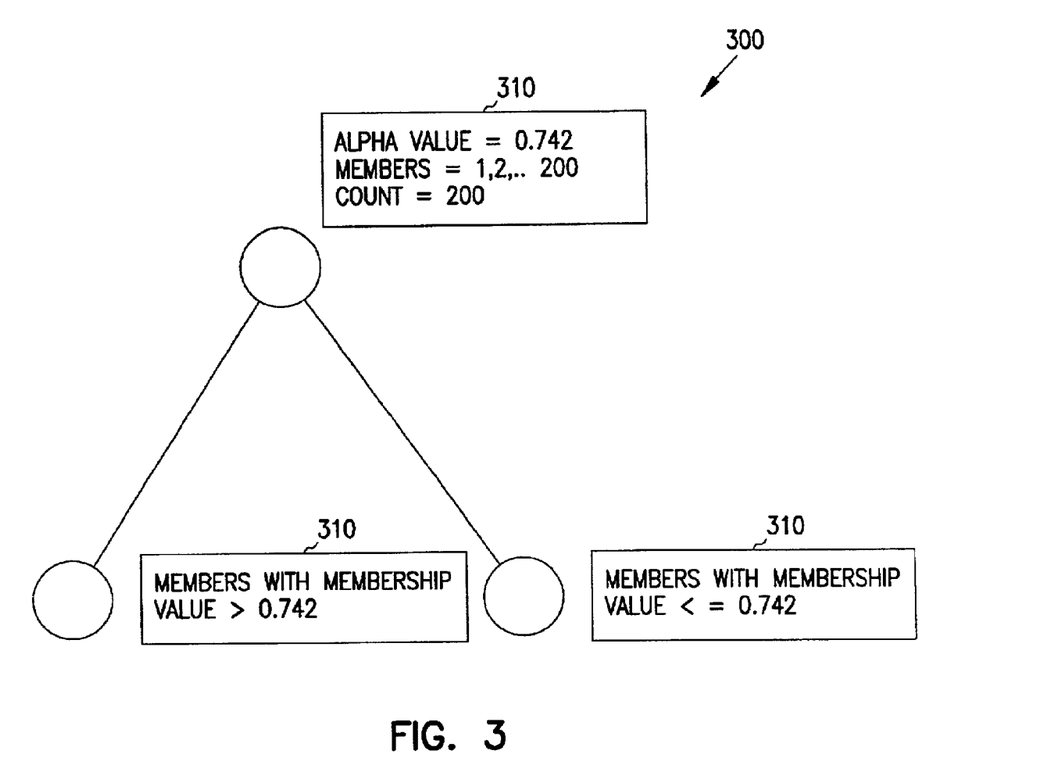
FIG. 3 illustrates formation of a binary tree according to the teachings of the present invention.

FIG. 3 illustrates the formed binary tree 300 including hierarchical clusters 310 for the crab example indicated above.

In some embodiments, the threshold value is computed as follows:

$$\text{threshold\_value} = \frac{1}{\eta}\sqrt{\sum_{i=0,j=0}^{i=\eta,j=n}(x_{(i+1),j} - x_{i,j})^2}$$

where η is a number of input vectors selected at random, generally $$\eta \cong \left(\frac{1}{10}\right)^{th}$$

of total input data values (which is equal to m). In our crab example indicated above the number of input vectors is 200, and hence a total of η=20 is chosen randomly. Using these values in the above algorithm yields a threshold_value of 0.3. The threshold_value is used to set the granularity of clustering. Lowering the threshold_value increases the number of clusters and vice-versa.

The leaf nodes of the constructed binary tree represent the final clusters. FIG. 2 illustrates an overview of clustering operation 200 according to the present invention. The clustering operation 200 illustrated in FIG. 2 is a Fuzzy logic approach. The operation 200 begins with step 210 by forming a compatibility relationship matrix including the input data using a distance function such that values obtained using the distance function is between 0 and 1. In the same crab example illustrated above, the final clusters include 4 nodes as follows:

Cluster 1-68
Cluster 2-64
Cluster 3-43
Cluster 4-25

Figure 4:
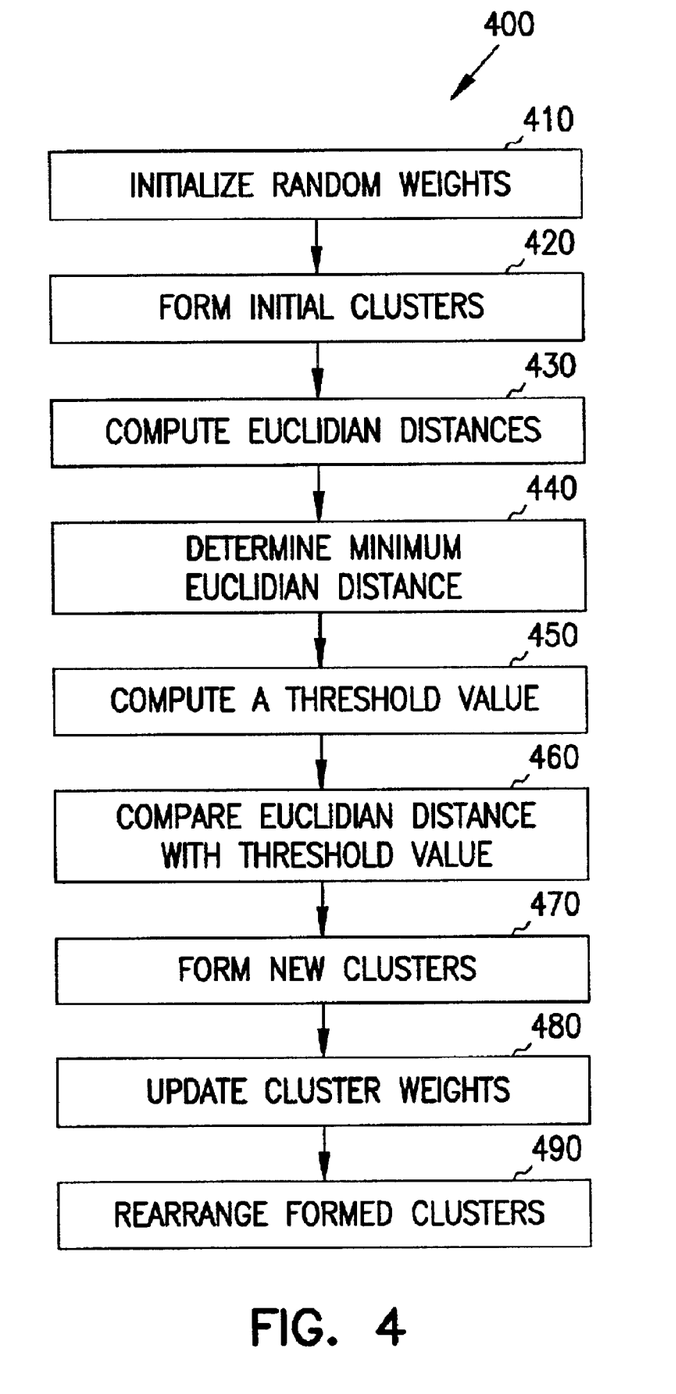
FIG. 4 illustrates clustering operation using the unsupervised learning technique.

FIG. 4 illustrates an overview of clustering operation 400 according to the unsupervised learning approach. The clustering operation 400 illustrated in FIG. 4 begins with step 410 by initializing random weights. In some embodiments, the initializing of random weights is as follows:

Initializing using top down and bottom up weights, where N and M are input and output nodes respectively as follows:

Top-down connection weight between node j and node i at time t is $t_{ji}(n=0)=1$ Bottom-up connection weight between node j and i at time t is $$w_{ji}(n=0)=1/(1+N)$$

where $0 \leq i \leq N-1$ and $0 \leq j \leq M-1$

Using the above algorithm for the crab example illustrated above yields the initialized cluster center weights as follows:

| <0.350649 | 0.317536 | 0.338235 | 0.347985 | 0.324074 | 0> |
|---|---|---|---|---|---|

Step 420 includes forming initial clusters. In some embodiments, first data input is assigned to cluster 1. For the crab example illustrated above, assigning the first data input yields cluster 1 as follows:

| <0.380952 | 0.364929 | 0.380952 | 0.38095 | 0.342593 | 1> |
|---|---|---|---|---|---|

Step 430 includes computing Euclidian distances between the sampled data and the formed clusters. In some embodiments, the Euclidian distances between the sampled data and the formed initial clusters are computed as indicated below:

$$\text{Euclidian\_dist}_i = \sqrt{\sum_{j=0}^{noofattributes}(\text{cluster\_weights}_i[j] - \text{current\_input}[j])^2}$$

where i varies over all the initally formed clusters

Using the above algorithm for the computed initialized random weights and the formed cluster 1 yields a Euclidian distance of 0.07969.

Step 440 includes computing the minimum Euclidian distance. In some embodiments, minimum Euclidian distance is computed as indicated below:

$$\text{min\_dist} = \min_i(\text{Euclidian\_dist}_i)$$

winner=i for which Euclidian_dist=min_dist

Using the above algorithm for the crab example yields a minimum Euclidian distance as follows:

Euclidian distance computed for cluster 1 is as follows:

| <0.0054 | 0.03508 | 0.037143 | 0.07969 | . . .> |
|---|---|---|---|---|

The minimum Euclidian distance from the above computed Euclidian distances for cluster 1 is 0.0054.

Step 450 includes computing a threshold value from the sampled data to set granularity of clustering. Step 340 includes comparing the determined minimum Euclidian distance with the computed threshold value. Step 470 includes forming new clusters. In some embodiments, the new clusters are formed as indicated below:

If the determined minimum Euclidian distance is less than or equal to the computed threshold value, then assigning the current input to the cluster corresponding to the minimum distance, and if the determined minimum Euclidian distance is greater than the computed threshold value, then forming a new cluster for the current input.

Step 480 includes updating cluster weights. The updated cluster weights for the crab example illustrated above is as follows:

| <0.079747 | 0.000000 | 0.000000 | 0.000000 | 0.000000> |
|---|---|---|---|---|

Step 490 can include assigning cluster index to each of the input data and rearranging the input data according to the formed clusters. Cluster index is a number that signifies to which cluster the input data belongs. Rearranging the input data includes rearranging the input data such that the input data belonging to a cluster in the formed clusters are grouped together.

Figure 5:
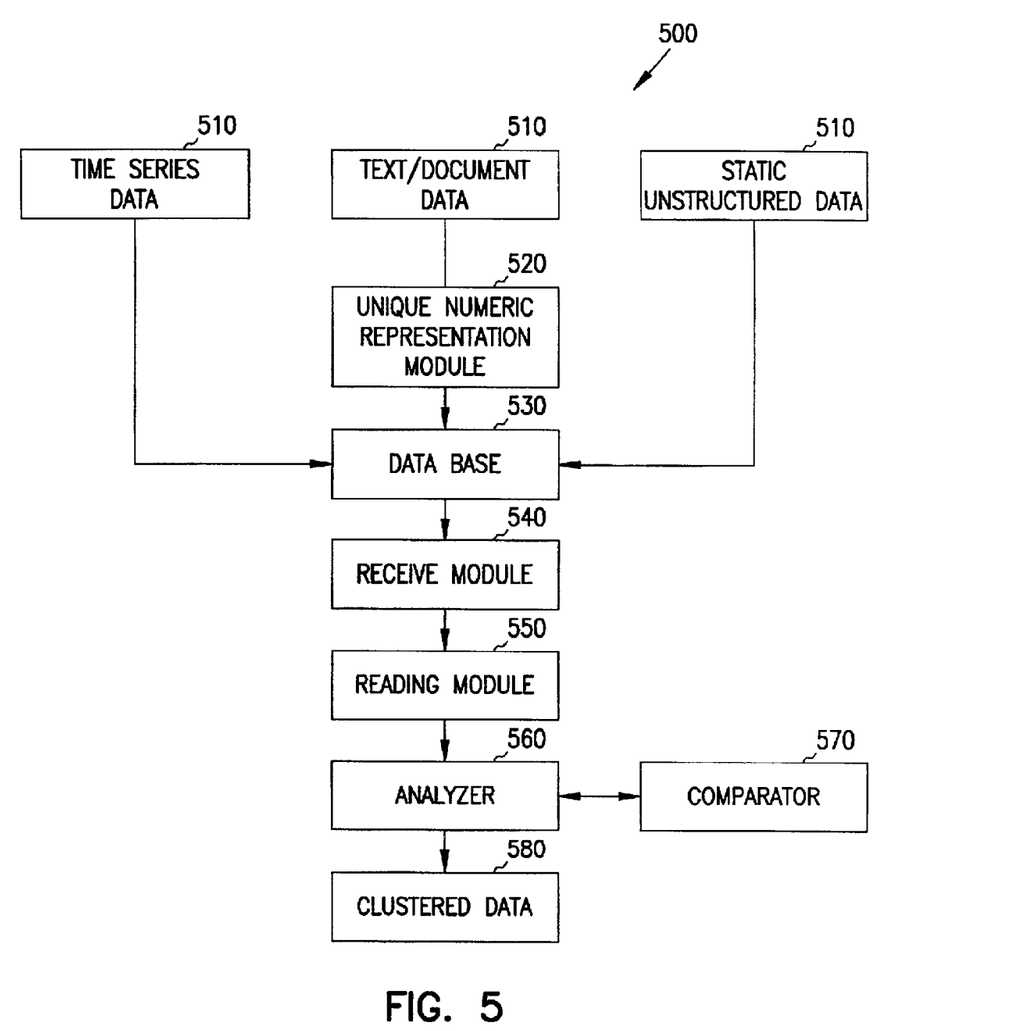
FIG. 5 illustrates an overview of a computer-implemented system of the embodiment shown in FIG. 1.

FIG. 5 illustrates an overview of one embodiment of a computer-implemented system 500 according to the present invention. A database 530 is connected to receive various types of input data 510. For example, the database can receive time series data, text/document data, and/or static unstructured data. In some embodiments, a unique numeric representation module 520 is coupled to receive text/document data 510 and transform the received text/document data into a unique numeric representation.

A receive module 540 is connected to database 530 and receives the input data from database 530. A reading module 550 is connected to receive module 540 to read a sample of the received data from the receive module 540. The reading module reads the sample of the received data such that the sample of read data has a predetermined window length. If receive module 540 receives static data, then the reading module 550 reads a sample of the received static data using a predetermined window length. If receive module 540 receives real-time data, then reading module 550 reads a sample of the received real-time data using a dynamically varying window of predetermined length.

An analyzer 560 connected to reading module 550 normalizes the read sample of the received data based on attributes in the read data. The analyzer 560 then checks the normalized data for uncertainty and/or robustness. In some embodiments, the analyzer checks the data for uncertainty and/or robustness by computing dispersion and sum of variance from the read sample of data.

A comparator 570 connected to analyzer 560 compares the variation in the computed sum of variance with a predetermined variance threshold value. Analyzer 560 then determines the clustering approach to be used for the read data based on the outcome of the comparison by comparator 570. In some embodiments, the analyzer clusters the read data using a fuzzy logic approach when a variation in the computed sum of variance is less than or equal to predetermined variance threshold value, and clusters the read data using unsupervised learning approach when the variation in the computed sum of variance is greater than the predetermined variance threshold value. The analyzer clusters the read data using an unsupervised learning approaches such as the parametric approach involving combined classification and parameterization and the non-parametric approach involving partitioning the unclassified data into subsets using Adaptive Resonance Theory. In some embodiments, analyzer 560 clusters the read sample of data based on input data characteristics such as linearity, non-linearity, uncertainty, and robustness. Analyzer 560 clusters the read data for data mining applications such as pattern recognition, pattern prediction, and supervised machine learning systems. The analyzer 560 repeats the reading of the sample of the received data using a dynamically varying window of predetermined window length when the read data is real-time data.

In some embodiments, analyzer 560 clusters the read data using a fuzzy logic approach by forming a compatibility relationship matrix including the read data using a distance function such that the value obtained using the distance function is between 0 and 1. Analyzer 560 then finds a transitive closure of the formed compatibility relations matrix, and computes a threshold value based on the read data to set granularity for the clustering, and further forms a binary tree including hierarchical clusters from the found transitive closure, and builds clusters based on the formed binary tree and outputs the clustered data 580. The fuzzy logic approach is discussed in more detail with reference to FIG. 2.

In some embodiments, analyzer 560 clusters the read data using an unsupervised learning approach by initializing random weights and computing Euclidian distances between formed clusters and input data. Analyzer 560 then determines a minimum Euclidian distance from the computed Euclidian distances and computes a threshold value based on the read data to set granularity for the clustering. Then comparator 570 compares the determined minimum Euclidian distance with the computed threshold value, and forms new clusters based on the outcome of the comparison, and further updates cluster weights based on newly formed clusters. In some embodiments, the analyzer further re-arranges data based on cluster index. The unsupervised logic approach to cluster the read data is discussed in more detail with reference to FIG. 4.

The methods 100, 200, and 400 shown in FIGS. 1, 2 and 4, may be implemented as a receive module 540, a reading module 550, an analyzer 560, and a comparator 570, as shown in FIG. 5. Various aspects of the present invention are implemented in software, which may be run in the environment shown in FIG. 5 or any other suitable computing environment. The present invention is operable in a number of other general purpose or special purpose computing environments. Some computing environments are personal computers, general-purpose computers, server computers, hand held devices, laptop devices multiprocessors, microprocessors, set top boxes, programmable consumer electronics, network PCS, minicomputers, mainframe computers, distributed computing environments, and the like to execute the code, which is stored on the computer readable medium. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 5 shows a general computing device in the form of an analyzer 560, which may include a processing unit, memory, removable storage, and non-removable storage. The memory may include volatile and non-volatile memory. Computer may include—of have access to a computing environment that includes—a variety of computer-readable media, such as volatile and non-volatile memory, removable and non-removable storage. Computer storage includes RAM, ROM, EPROM & EEPROM, flash memory or other memory technologies, CD_ROM, digital versatile disks (DVD) or other optical disk storage, magnetic cassettes, magnetic tape, magnetic disk storage or other magnetic storage devices, or any other medium capable of storing computer-readable instructions. Computer—may include—or have access to a computing environment that include input, output, and a communication connection. The computer may operate in a networked environment using a communication connection to connect to one or more remote computers. The remote computer may include a personal computer, server, router, network PC, a peer device or other common network node, or the like. The communication connection may include a local area network (LAN), a wide area network (WAN) or other networks.

Conclusion

The above-described computer-implemented method and system provides an efficient technique that can provide a generic solution to clustering input data (static as well as real-time data) having characteristics such as linearity, non-linearity, uncertainty, and robustness.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A computer-implemented method for clustering input data, comprising:
   receiving data;
   reading a sample of the received data having a predetermined window length;
   checking the read data for uncertainty and/or robustness; and
   determining the clustering approach to be used to cluster the received data based on the outcome of the checking.

2. The method of claim 1, wherein input data comprises data selected from the group consisting of static data and real-time data.

3. The method of claim 2, wherein reading the sample of data further comprises:
   if the received data is static data, then reading a sample of the received static data using a predetermined window length; and
   if the received data is real-time data, then reading a sample of the received real-time data using a dynamically varying window of predetermined window length.

4. The method of claim 3, further comprising:

normalizing the read sample of the received data based on attributes in the read sample of data.

5. The method of claim 3, wherein checking the data for uncertainty and/or robustness comprises:

selecting multiple blocks of data from the read sample of data;

computing dispersions for each of the selected blocks;

computing a sum of variance from the computed dispersions; and comparing variation in the computed sum of variance to a predetermined variance threshold value.

6. The method of claim 5, wherein determining the clustering approach comprises:

determining the clustering approach to be used to cluster the read data based on the outcome of the comparison.

7. The method of claim 6, wherein determining the clustering approach to be used to cluster the read data comprises:

if the variation in the computed sum of variance is less than or equal to the predetermined variance threshold value, then clustering the read sample of the data using a fuzzy logic approach for data mining applications; and if the variation in the computed sum of variance is greater than the predetermined variance threshold value, then clustering the read sample of the data using an unsupervised learning approach for data mining applications.

8. The method of claim 7, wherein the unsupervised learning approach comprises:

an unsupervised learning approach of the input data based on unsupervised learning methods selected from the group consisting of the parametric approach involving combined classification and parameterization and the non-parametric approach involving partitioning the unclassified data into subsets using Adaptive Resonance Theory.

9. The method of claim 7, wherein clustering the data comprises:

clustering the data based on input data characteristics selected from the group consisting of linearity, non-linearity, uncertainty, and robustness.

10. The method of claim 7, wherein the data mining applications comprise:

applications selected from the group consisting of pattern recognition, pattern prediction, and supervised machine learning systems.

11. The method of claim 7, further comprising:

if the received data is real-time data, then repeating the reading of the sample of the received real-time data using a dynamically varying window of predetermined window length.

12. The method of claim 7, wherein clustering the data using the fuzzy logic approach comprises:

forming a compatibility relationship matrix including the input data using a distance function such that values obtained using the distance function is between 0 and 1 finding a transitive closure of the formed compatibility relationship matrix; and forming a binary tree including hierarchical clusters from the found transitive closure.

13. The method of claim 7, wherein clustering the data using the unsupervised learning approach comprises:

initializing the input data using random weights forming initial clusters using input data;

computing Euclidian distances between the data and the formed initial clusters;

determining a minimum Euclidian distance from the computed Euclidian distances;

computing a threshold value from the sampled data to set granularity of clustering;

comparing the minimum Euclidian distance with the computed threshold value;

if the determined minimum Euclidian distance is less than or equal to the computed threshold value, then assigning a current input to a cluster corresponding to the minimum Euclidian distance;

if the determined minimum Euclidian distance is greater than the computed threshold value, forming a new cluster for the current input;

updating cluster weights based on formed new clusters.

14. A computer readable medium having instructions stored thereon to cause a computer to implement a method for clustering input data, comprising:

receiving data;

reading a sample of the received data having a predetermined window length;

checking the read data for uncertainty and/or robustness; and determining the clustering approach to be used to cluster the received data based on the outcome of the checking.

15. The computer readable medium of claim 14, wherein the input data comprises data selected from the group consisting of static data and real-time data.

16. The computer readable medium of claim 15, wherein reading the sample of the data further comprises:

if the received data is static data, then reading a sample of the received static data using a predetermined window length; and if the received data is real-time data, then reading a sample of the received real-time data using a dynamically varying window of predetermined window length.

17. The computer readable medium of claim 16, further comprising:

normalizing the read sample of the received data based on attributes in the read sample of data.

18. The computer readable medium of claim 16, wherein checking the data for uncertainty and/or robustness comprises:

computing dispersion and sum of variance from the read sample of data; and comparing variation in the computed sum of variance to a predetermined variance threshold value.

19. The computer readable medium of claim 18, wherein determining the clustering approach comprises:

determining the clustering approach to be used to cluster the read data based on the outcome of the comparison.

20. The computer readable medium of claim 19, wherein determining the clustering approach to be used to cluster the read data comprises:

if the variation in the computed sum of variance is less than or equal to the predetermined variance threshold value, then clustering the read sample of the data using a fuzzy logic approach for data mining applications; and if the variation in the computed sum of variance is greater than the predetermined variance threshold value, then clustering the read sample of the data using an unsupervised learning approach for data mining applications.

21. The computer readable medium of claim 20, wherein the unsupervised learning approach comprises:
an unsupervised learning approach of the input data based on unsupervised learning methods selected from the group consisting of the parametric approach involving combined classification and parameterization and the non-parametric approach involving partitioning the unclassified data into subsets using Adaptive Resonance Theory.

22. The computer readable medium of claim 21, wherein clustering the data comprises:
clustering the data based on input data characteristics selected from the group consisting of linearity, non-linearity, uncertainty, and robustness.

23. The computer readable medium of claim 22, wherein the data mining applications comprise:
applications selected from the group consisting of pattern recognition, pattern prediction, and supervised machine learning systems.

24. The computer readable medium of claim 21, further comprising:
if the received data is real-time data, then repeating the reading of the sample of the received real-time data using a dynamically varying window of predetermined window length.

25. The computer readable medium of claim 21, wherein clustering the data using the fuzzy logic approach comprises:
forming a compatibility relationship matrix including the input data using a distance function such that values obtained using the distance function is between 0 and 1
finding a transitive closure of the formed compatibility relationship matrix; and
forming a binary tree including hierarchical clusters from the found transitive closure.

26. The computer readable medium of claim 21, wherein clustering the data using an unsupervised learning approach comprises:
initializing random weights;
forming initial clusters using the input data;
computing Euclidian distances between clusters;
determining a minimum Euclidian distance from the computed Euclidian distances;
computing a threshold value from the sampled data to set granularity of clustering;
comparing the minimum Euclidian distance with the computed threshold value;
forming new clusters based on the outcome of the comparison; and
updating cluster weights based on formed new clusters.

27. A computer-implemented system for clustering input data, comprising:
a receive module to receive data;
a reading module to read a sample of the received data having a predetermined window length; and
an analyzer to check the read data for uncertainty and/or robustness, and determine the clustering approach to be used to cluster the received data based on the outcome of the checking.

28. The system of claim 27, wherein the data comprises data selected from the group consisting of static data and real-time data.

29. The system of claim 28, wherein the reading module reading the sample of data further comprises:
if the received data is static data, then reading a sample of the received static data using a predetermined window length; and
if the received data is real-time data, then reading a sample of the received real-time data using a dynamically varying window of predetermined window length.

30. The system of claim 29, wherein the analyzer normalizes the read sample of the received data based on attributes in the read sample of data.

31. The system of claim 30, wherein the analyzer checking the data for uncertainty and/or robustness further computes dispersion and sum of variance from the read sample of data to check for uncertainty and/or robustness.

32. The system of claim 31, further comprising:
a comparator to compare variation in the computed sum of variance to a predetermined variance threshold value.

33. The system of claim 32, wherein the analyzer determines the clustering approach to be used to cluster the read data based on the outcome of the comparison from the comparator.

34. The system of claim 33, wherein the analyzer determining the clustering approach to be used to cluster the read data comprises:
clustering the read data of data using a fuzzy logic approach for data mining application, if the variation in the computed sum of variance is less than or equal to the predetermined variance threshold value; and
clustering the read sample of data using an unsupervised learning approach for data mining applications, if the variation in the computed sum of variance is greater than the predetermined variance threshold value.

35. The system of claim 34, wherein the unsupervised learning approach comprises:
an unsupervised learning approach of the input data based on unsupervised learning methods selected from the group consisting of the parametric approach involving combined classification and parameterization and the non-parametric approach involving partitioning the unclassified data into subsets using Adaptive Resonance Theory.

36. The system of claim 34, wherein clustering the data comprises:
clustering the data based on input data characteristics selected from the group consisting of linearity, non-linearity, uncertainty, and robustness.

37. The system of claim 34, wherein the data mining applications comprise:
data mining applications selected from the group consisting of pattern recognition, pattern prediction, and supervised machine learning systems.

38. The system of claim 34, wherein the analyzer repeats the reading of the sample of the received data using a dynamically varying window of predetermined window length when the received data is real-time data.

39. The system of claim 34, wherein the analyzer clusters the read sample of data using a fuzzy logic approach by forming a compatibility relationship matrix including the input data using a distance function such that values obtained using the distance function is between 0 and 1,
wherein the analyzer finds a transitive closure of the formed compatibility relations matrix, and wherein the analyzer further forms a binary tree including hierarchical clusters from the found transitive closure, builds clusters based on the formed binary tree.

40. The method of claim 34, wherein the analyzer clusters the read sample of data using an unsupervised learning approach by initializing the read data using random weights, forming clusters using the initialized data, and computing Euclidian distances between the formed clusters and the data, wherein the analyzer determines a minimum Euclidian distance from the computed Euclidian distances, wherein the analyzer computes a threshold value from the sampled data to set granularity of clustering, wherein the comparator compares the determined minimum Euclidian distance with the computed threshold value, and forms new clusters based on the outcome of the comparison, and updates cluster weights based on formed new clusters, and wherein the analyzer re-arranges data based on cluster index.

* * * * *